Dec. 3, 1940.  P. BURKE ET AL  2,224,098
WRAPPING MACHINE
Filed Oct. 19, 1937  4 Sheets-Sheet 2
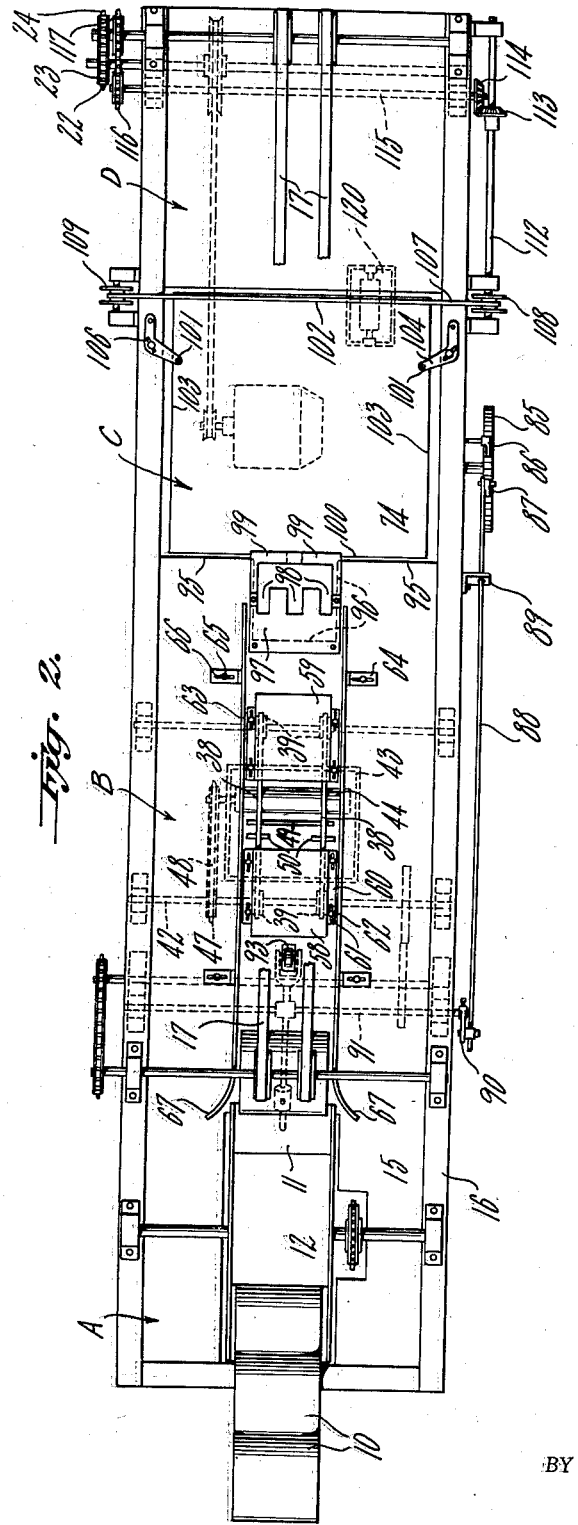
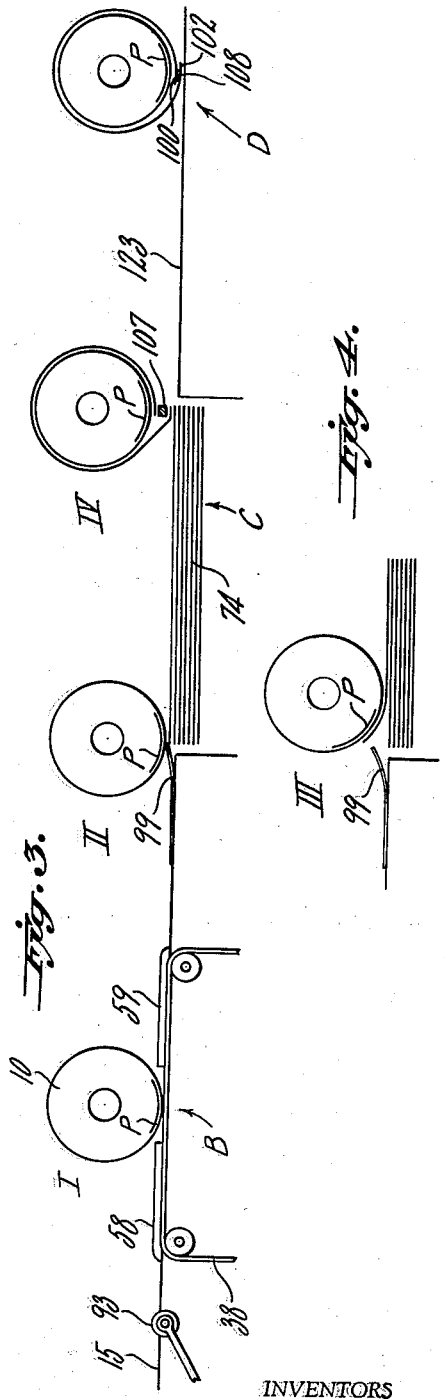
INVENTORS
PAUL BURKE
JOHN E. BLOSSER
BY James D. Bock
ATTORNEY.

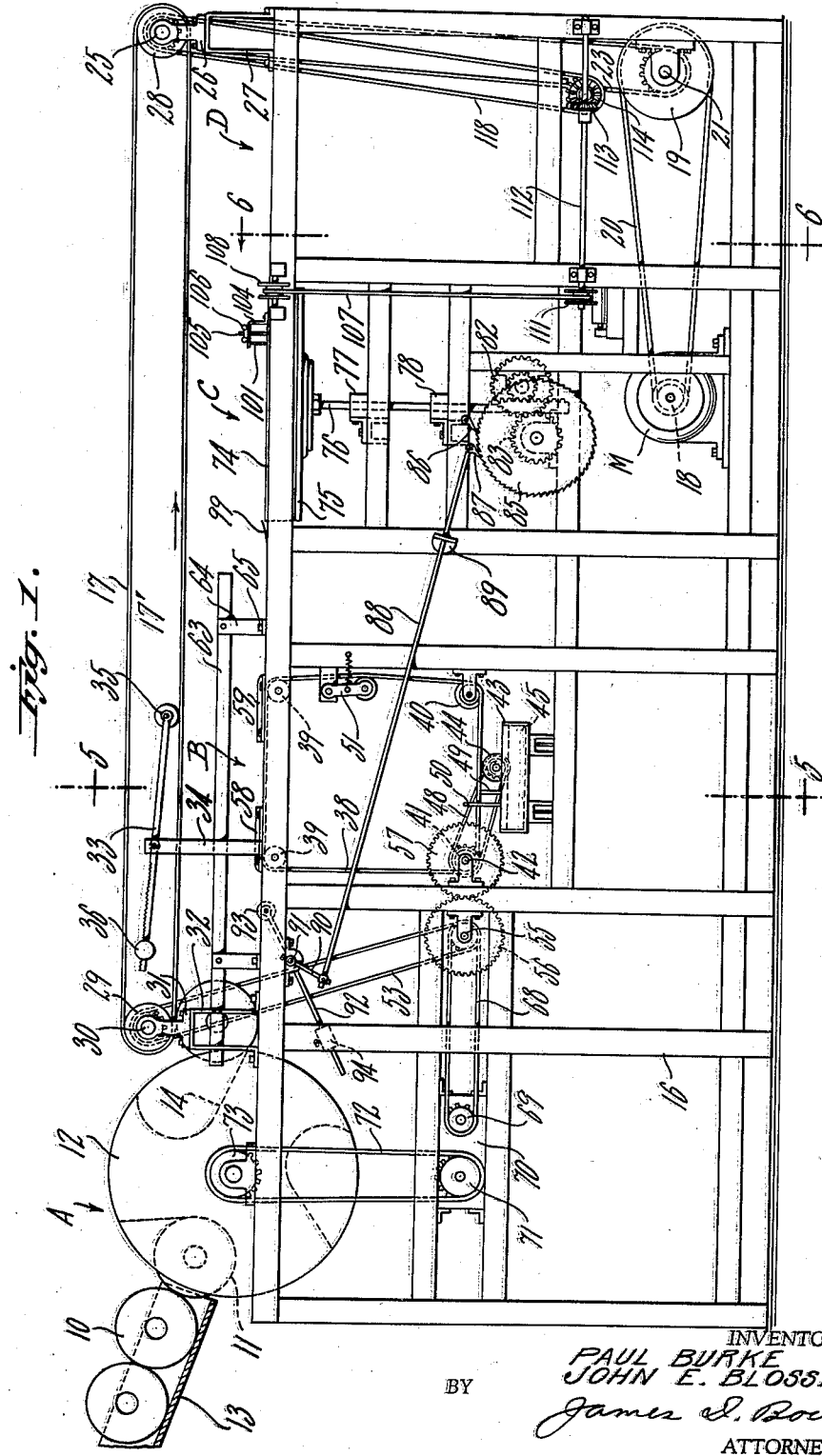

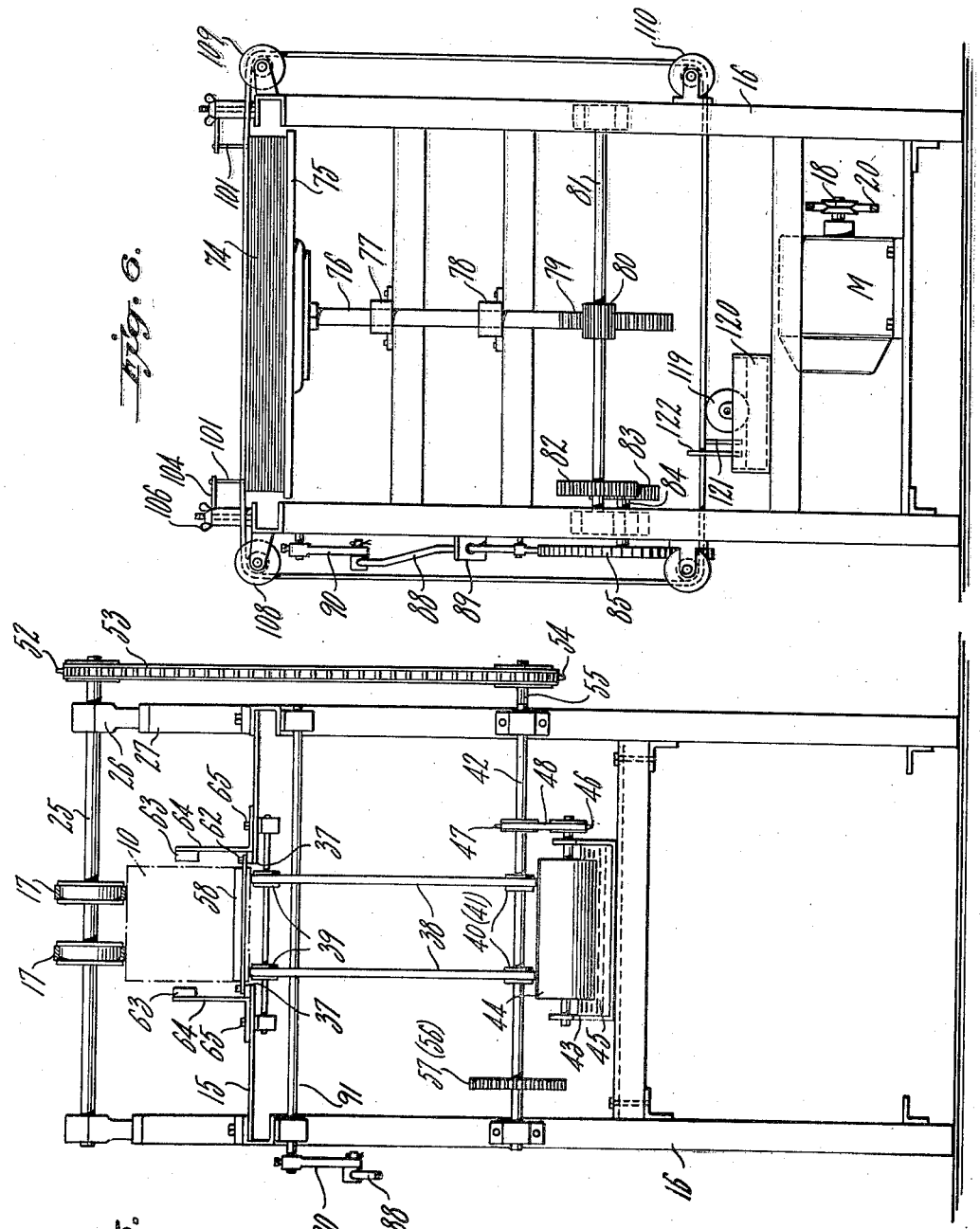

Dec. 3, 1940.   P. BURKE ET AL   2,224,098
WRAPPING MACHINE
Filed Oct. 19, 1937   4 Sheets-Sheet 4
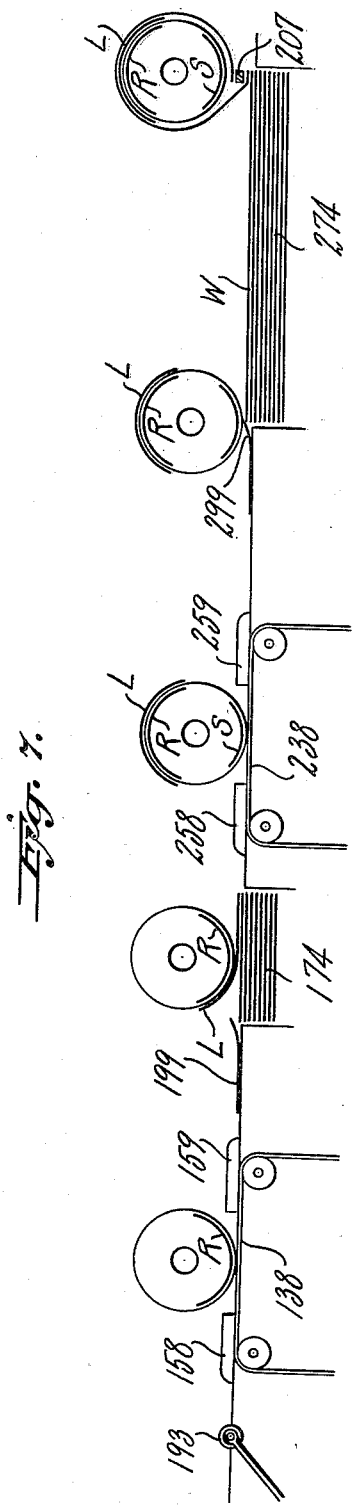
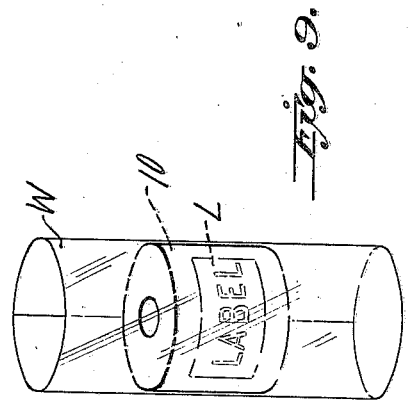
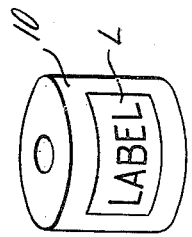
INVENTORS
PAUL BURKE
JOHN E. BLOSSER
BY James D. Bock
ATTORNEY.

Patented Dec. 3, 1940

2,224,098

UNITED STATES PATENT OFFICE 2,224,098

WRAPPING MACHINE

Paul Burke, South Glens Falls, and John Edward Blosser, Glens Falls, N. Y., assignors to International Tissue Corp., a corporation of New York Application October 19, 1937, Serial No. 169,822

2 Claims. (Cl. 216—58)

Our present invention relates to wrapping machines of the type adapted to apply a band, wrapper or label to objects of generally cylindrical conformation.

It is frequently desired to apply a label to, or to encircle with a band or wrapper, the curved surface of such objects as containers, cans, bottles, rolls of paper or textiles or other objects whose conformation is generally cylindrical. It is an object of our present invention to provide a machine which will automatically perform this desirable operation in a simple and efficient manner at a high rate of speed.

It is a further object of our invention to provide means for applying stripes of adhesive material to the curved surface of a cylindrical object, conveying the adhesive bearing object to a supply of wrappers, labels or the like and causing a wrapper or label to be adhesively secured to the object.

It is a further object of our invention to provide means for the successive application of a plurality of bands, wrappers or labels to the curved surface of a cylindrical object.

Other and further objects of our invention will become apparent from a reading of the following description which, taken in connection with the accompanying drawings, sets forth a preferred but not necessarily the only embodiment of our invention. The embodiment of our invention herein described is particularly adapted for the application of wrappers to rolls of toilet tissue and contemplates the application of stripes of paste to the curved surface of such rolls for the purpose of securing the wrappers thereto. It will be understood that our invention may be employed to wrap, band or label cylindrical objects in general and that adhesive material of any desired type may be used therein and, therefore, that the following description is to be taken in an explanatory rather than in a limiting sense.

The machine disclosed can be used to apply a label covering a portion only of the cylindrical surface or to apply a wrapper covering the entire cylindrical surface, or to apply first an insert and then a wrapper. If the wrapper be transparent, the insert may function as a label. In order to simplify the terminology of the claims the word "wrapper," unless restricted by the context, shall be taken to mean either a sheet covering a portion only of the cylindrical surface or a sheet completely wrapping the cylindrical surface. The word "insert" shall be taken to mean a supplementary sheet enclosed by a wrapper which sheet may, in some cases, function as a conventional "label."

In the drawings,

Fig. 1 is a side elevation of a machine embodying our invention;

Fig. 2 is a top plan view of the same;

Fig. 3 is a diagrammatic illustration of the operation of our invention;

Fig. 4 is a further diagrammatic illustration of the same;

Fig. 5 is a section along the line 5—5 of Fig. 1;

Fig. 6 is a section along the line 6—6 of Fig. 1;

Fig. 7 is a diagrammatic illustration of the operation of a modified form of our invention; and Figs. 8 and 9 illustrate one form of wrapping which may be applied by the form of our invention illustrated in Fig. 7.

The machine disclosed comprises a roll supply station A, a paste applying station B, a wrapping station C and a drying and discharging station D.

At station A rolls 10, which are to be wrapped, are individually deposited in pockets 11 of a feed wheel 12. The wheel 12 is driven at a speed commensurate with the capacity of the remainder of the machine, by means to be hereinafter described, and serves to feed the rolls 10 to the machine at such intervals as to avoid interference in the wrapping of successive rolls. The rolls 10 may be supplied to the feed wheel 12 by hand or by any other suitable means such as a gravity chute 13. The pockets 11 are cut away as at 14 to insure the discharge of the rolls therefrom.

The rolls 10 are discharged from the wheel 12 upon a table 15 supported in a suitable manner upon a main frame 16 and are automatically positioned under parallel feed belts 17 which are continuously driven in the direction of the arrow in Fig. 1.

A motor M is suitably supported in the main frame 16 and through the medium of pulleys 18 and 19 and a belt 20, imparts rotation to a shaft 21 mounted in suitable bearings upon the main frame 16. A sprocket wheel 22 is mounted for rotation with the shaft 21 and through the medium of a sprocket chain 23 and wheel 24 imparts rotation to a shaft 25 mounted in suitable bearings 26 carried by supports 27. Sheaves or pulleys 28 are mounted for rotation with the shaft 25 and serve to support and drive the endless belts 17. Similar sheaves or pulleys 29 are mounted for rotation with a shaft 30 carried in bearings 31 mounted upon supports 32 at the opposite end of the machine. The belts 17 are conducted around the pulleys 29 and serve to impart rotation to the shaft 30.

The belts 17 are supported at such a height above the table 15 that the lower reaches 17' thereof will bear upon the rolls 10 as they are discharged upon the table by the feed wheel 12. The rolls 10 are thus continuously rolled through the stations B, C and D.

If so desired, a suitable belt tightener may be associated with the belts 17 in order to insure adequate contact between the belts and the rolls 10 as they progress through the machine. Accordingly, a two armed lever 33 is pivoted upon a suitable support 34. One arm of the lever 33 carries a weighted roller 35 which bears upon the lower reaches 17' of the belts 17. The other arm of the lever 33 carries a counterweight 36 which may be adjusted therealong to vary the effect of the weighted roller 35 upon the belts 17.

At station B the table 15 is provided with an opening 37 (Fig. 5) of a width somewhat greater than the altitude of the cylindrical roll 10. Within the opening 37 are located the upper horizontal reaches of endless paste belts 38. The belts 38 are guided over pulleys 39 and are so located that their upper surfaces lie approximately within the plane of the upper surface of table 15. The belts 38 are further guided over pulleys 40 rotatably mounted upon the main frame 16 and driven pulleys 41 mounted for rotation with a shaft 42.

The lower horizontal reaches of the belts 38 are passed over a paste applying device which deposits a film of paste upon the outer surfaces of the belts. The paste applying device comprises a container 43 and a roller 44 which dips into a supply 45 of paste within the container. The upper surface of the roller 44 is maintained in contact with the outer surfaces of the belts 38. The roller 44 is rotatably connected with the shaft 42 by means of sprockets 46 and 47 and a sprocket chain 48. A doctor blade 49 may be provided to remove excess paste from the outer surfaces of the belts 38, while additional doctor blades 50 may be provided to remove any paste which may inadvertently be deposited upon the vertical edges of the belts 38. The belts 38 may be maintained under suitable tension by any desired means as, for example, the spring operated belt tightener indicated at 51.

The shaft 42 is driven from the shaft 30 by the following means: A sprocket 52 is mounted for rotation with the shaft 30 and through a sprocket chain 53 imparts rotation to a sprocket 54 and shaft 55 to which the sprocket 54 is fixed. Also, fixed to the shaft 55 is a pinion 56 which meshes with a similar pinion 57 fixed upon the shaft 42. The belts 38 may thus be driven at such a speed as to insure the presentation of fresh paste bearing surfaces to each of the rolls 10 which are passed through the paste applying station.

Means are provided to accurately control the circumferential extent and location of the paste stripes applied to the rolls 10. For this purpose, guard plates 58 and 59 are mounted upon the table 15 overlying portions of the opening 37 and the belts 38. The plates 58 and 59 are provided with flanges 60 having slots 61 therein. Studs 62 are received in the slots 61 and may be loosened to permit relative as well as joint adjustment of the plates 58 and 59. The relative adjustment of the plates 58 and 59 is availed of to vary the extent of the paste bearing belts 38 exposed for contact with the rolls 10 passing through the machine. Plates 58 and 59 of various sizes may be provided if so desired for variations beyond the range of the studs and slots shown. Thus, a relatively small space may be left between the plates 58 and 59 and the exposed portions of the belts 38 will apply stripes of paste of relatively small peripheral extent upon the rolls 10. The plates 58 and 59 may be moved farther apart for the application of stripes of greater peripheral extent and this adjustment may be carried to such a point that the paste stripes will completely encircle the rolls 10. The joint adjustment of plates 58 and 59 serves to vary the horizontal location of the exposed portions of belts 38. Thus, the distance through which the rolls 10 must be rolled from the paste applying station B to the wrapping station C may be so adjusted that the paste stripes applied at station B will be caused to accurately register in desired relationship with the station C.

Guides 63 may be provided for maintaining the rolls 10 in proper alignment as they pass through the paste applying station. The guides 63 comprise elongated flat bars supported upon brackets 64 which are in turn secured by means such as studs 65 to the table 15. Slots 66 may be provided in the horizontal portions of the brackets 64 to permit relative adjustment of the guides 63 for cooperation with rolls 10 of various widths. The guides 63 are preferably flared as at 67 to embrace the wheel 12 thus assuring accurate entry of the rolls 10 into the paste applying station.

The feed wheel 12 may be driven from a sprocket, fixed to the shaft 55, through a sprocket chain 68 and a sprocket 69 arranged to drive a gear box 70. The gear box 70 contains suitable gearing to produce rotation of a sprocket 71 which through a sprocket chain 72 and sprocket 73 serves to rotate the wheel 12. The speed of rotation of the wheel 12 may be predetermined by the arrangement of gears within the gear box 70.

The rolls 10, to which the stripes of paste have been applied, are progressed over the guard plate 59 and an intervening portion of table 15 to the wrapping station C. At this station the paste stripes are caused to contact a wrapper and continued rolling motion of the roll 10 will cause such wrapper to be wound upon the cylindrical surface of the roll. For the purpose of illustration, we have shown an embodiment wherein wrappers of a width substantially greater than that of the rolls 10 are caused to completely encircle the rolls and wherein such wrappers overlap at their ends. It will be understood that bands of a width equal to or less than that of the rolls may be similarly applied and that labels or inserts of any width which do not encircle the rolls 10 may also be applied by apparatus constructed according to our invention.

A supply of wrappers 74, comprising a stack of superimposed separate sheets of paper or other suitable material, is maintained at a substantially constant level by the following mechanism: The supply 74 is supported upon a plate 75, which is in turn supported for vertical movement by a bar 76 slidably guided in bearings 77 and 78. The lower end of bar 76 is formed as a rack 79 meshing with a pinion 80 fixed upon a shaft 81 rotatably mounted in suitable bearings upon the main frame 16. A pinion 82, also fixed upon shaft 81, meshes with a pinion 83 fixed upon a stub shaft 84 rotatably mounted in a suitable bearing upon the main frame 16. Also fixed upon the stub shaft 84 is a ratchet wheel 85. A detent 86 pivoted upon the main frame 16 engages the teeth of the ratchet 85 and prevents rotation thereof under the influence of the weight of the wrapper supply 74. A pawl 87 pivoted on one end of a link 88 is provided for engagement with the teeth of ratchet 85. The link 88 may be supported and guided by an eye 89 pivotally supported upon the main frame 16. At its other end the link 88 is pivotally connected to an arm 90 fixed upon a rock shaft 91. The rock shaft 91 extends across the machine and is supported for rotation in suitable bearings. A two armed lever 92 is fixed upon the rock shaft 91 and one end thereof is formed as a yoke within which is rotatably mounted a roller 93. The roller 93 projects through a suitable opening in the table 15, into a position to be engaged and depressed by each of the rolls 10 passing through the machine. An adjustable counterweight 94 is mounted upon the other arm of lever 92 and serves to return the parts 87, 88, 90, 91, 92 and 93 to their initial position after each operation.

Depression of the roller 93 by a roll 10 passing thereover imparts a clockwise rotation to the shaft 91 and arm 90. The link 88 is therefore drawn to the left as viewed in Fig. 1 carrying with it the pawl 87 which, in turn, imparts a step of rotation to the ratchet wheel 85. This movement of ratchet wheel 85 is transmitted through gears 83, 82, 80 and rack 79 to the plate 75 and produces vertically upward movement thereof. The pitch of the teeth upon ratchet wheel 85 and the ratio of gears 83 and 82 may be so selected that each depression of the roller 93 will result in a vertical movement of the wrapper supply 74 exactly equal to the thickness of a single sheet of the wrapping material constituting the supply 74. Hence, as each successive sheet of material is removed from the supply 74, a compensatory elevation of the supply will occur and the upper surface of the supply will be maintained at a constant level.

The table 15 is cut away along the line 95 and is recessed as at 96. A detachable plate 97 is secured to the table 15 and serves to cover a portion of the recess 96. The plate 97 is notched as at 98 to provide clearance for the paste stripes borne by the rolls 10. It will be understood that the notches 98 will be aligned with the paste belts 38 and that substitute plates 97 may be provided for use when the position or number of belts 38 is materially changed. The construction just described avoids the deposition of paste upon the table 15 which would occur if the table were to extend throughout its width to the edge 95.

A separator 99, 99 is provided to insure the picking up of a single sheet of wrapping material by each of the paste bearing rolls 10. The separator comprises two L-shaped members 99 of thin resilient metal. One arm of each of the L-shaped members extends longitudinally of the path of the rolls 10 and lies near the outer edge of such path. These arms are secured by any convenient means to the table 15 or to the plate 97 and are curved upwardly as seen in Fig. 1 and as indicated diagrammatically in Figs. 3 and 4. The other arms of the members 99 extend toward each other transversely of the path of the rolls 10 and preferably overlap, as indicated in Fig. 2. The separator 99, 99 is so shaped and proportioned that the outer transverse edge thereof will normally lie just over the leading edge 100 of the sheets forming the supply 74. While it is preferred to form the separator 99, 99 in two parts, as shown, it will be obvious that a single U-shaped part may be used if so desired. The operation of the separator, above described, will be set forth hereinafter.

It has been found that the rolling of the rolls 10 over the upper surface of the supply 74 has a tendency to disarrange the stack of sheets forming the supply. It is essential to maintain the leading edges 100 of such sheets in accurate vertical alignment with each other and with the edge of the separator 99, 99. To this end, we provide pins 101 which bear with substantial pressure upon the upper surface of the supply 74. These pins 101 are located near the trailing edges 102 of the sheets and in very close proximity to the marginal edges 103 thereof. The pins 101 are mounted upon spring arms 104 which are, in turn, mounted upon the main frame 16. Threaded studs 105 mounted upon the frame 16 and wing nuts 106 are provided to exert variable pressure upon the arms 104 and pins 101. By suitable adjustment of the wing nuts 106, the pins 101 may be caused to bear upon the supply 74 with pressure sufficient to hold the sheets forming the supply in accurate superimposed relationship.

When a roll 10 is passed over the supply 74, the leading edge 100 of the uppermost sheet will be picked up by the paste stripes upon the roll, as will be more fully described hereinafter. The continued rolling movement of the roll 10 will cause the sheet to be wrapped around the roll and the leading edge 100 will become engaged by the belts 17. The wrapping of the sheet around the roll 10 will then be sufficiently complete to force the marginal edges 103 out from under the pins 101. As set forth above, the upper surface of the supply 74 is maintained at a constant level by a series of compensatory vertical movements. The spring arms 104 are arranged to yield sufficiently to permit such movements to occur.

If so desired, a paste belt 107 may be provided to apply a stripe of paste 108 (Fig. 3) to the wrappers along their leading edges 100. This paste stripe serves to secure the overlapping edges 100 and 102 together. The paste belt 107 is guided over idler pulleys 108, 109 and 110 mounted for rotation upon the main frame 16 and a driven pulley 111 fixed upon a shaft 112 mounted for rotation in suitable bearings upon the main frame. A bevel gear 113 is fixed upon the shaft 112 and meshes with a similar bevel gear 114 fixed upon a shaft 115. The shaft 115 is driven from the shaft 25 by means of sprocket wheels 116 and 117 and a chain 118. Paste is supplied to the belt 107 by a roller 119 maintained in contact therewith and dipping into a supply 120 of paste. Doctor blades 121 and 122 may be provided to control the thickness of the paste film carried by the belt 107 and to clean the vertical edges of the belt.

It will thus be apparent that the belt 107 is guided, paste side up, over the trailing edges 102 of the sheet supply. As the revolution of the roll 10 upon the supply 74 is completed the leading edge 100 of the sheet on the roll is pressed into contact with the paste bearing surface of the belt 107. The trailing edge then slips from beneath the belt and is pressed into contact with the paste bearing edge 100.

Station D comprises a table 123 of sufficient extent to permit the rolls 10 to perform at least a complete revolution thereon under pressure of the belts 17. At this station, the wrapper is again pressed into contact with the stripes of paste upon the roll 10 and the edges 100 and 102 are again pressed into contact with paste stripe 108. The preliminary drying of the paste which occurs at this station is sufficient to allow the rolls 10 to be discharged from the machine without danger or disarrangement of the wrappers thereon.

The operation of our improved wrapping machine will now be described.

A roll 10 is placed in a pocket 11 of the feed wheel 12. Rotation of the wheel 12 carries the roll therein to a position wherein the roll will gravitate downwardly along the surface 14 and will thus be deposited upon the table 15 in such a position that the belts 17 will engage the upper curved surface of the roll 10 to progress the roll through the machine. As the roll progresses over the table 15, it strikes and depresses the roller 93. A depression of the roller 93 operates, as above described, to elevate the supply 74 a distance equal to the thickness of a single sheet of the wrapping material comprising such supply. The roll next progresses over the guard plate 58 and drops from this plate to the paste bearing surfaces of the belts 38. As the roll progresses over the belts 38, the stripes of paste are deposited upon the curved surface thereof. In Figures 3 and 4, the peripheral extent of the paste stripes is indicated diagrammatically by a curved line P. The roll then progresses over the plate 59. It will be understood that the plates 58 and 59 have been so adjusted relative to one another as to expose an extent of the belts 38 sufficient to deposite paste stripes of the desired peripheral extent upon the curved surface of the roll 10. After the roll leaves the plate 59, it is progressed over the table 15 and plate 97 and is then rolled upon the separator 99, 99. As shown in Figure 3, the roll 10 depresses the separator 99, 99 into contact with the leading edge 100 of the uppermost sheet within the supply 74. The horizontal distance between the exposed surfaces of the belts 38 and the leading edge 100 of the sheet is predetermined by joint adjustment of the plates 58 and 59 and is preferably so selected that the paste stripes indicated at P will contact the leading edge 100 mid-way of their peripheral extent upon the surface of the roll 10. Thus, one-half of the paste stripes may be pressed into contact with the leading portion of the uppermost sheet within the supply 74, while the other half of the paste stripes remains, for the present, unused.

As the roll 10 leaves the separator 99, 99, a portion of the paste stripes will be progressively pressed into contact with the leading portion of the sheet. The sheet will adhere to the paste stripes and will be caused to wrap upon the curved surface of the roll 10. As the leading edge 100 of the sheet is lifted from the supply stack 74, it will brush past the edge of the separator 99, 99. Since the separator 99, 99 tends to spring away from the supply 74, the brushing thereof by the edge 100 will be so light that there will be no tendency to strip the sheet from the adhesive. If it should occur that more than one sheet tends to wrap upon the roll 10, the brushing of the edges 100 thereof against the separator 99, 99 will serve to return all but the uppermost sheet to the supply stack 74. The action of the separator 99, 99 is diagrammatically illustrated at positions II and III in Figures 3 and 4 respectively.

The roll 10 to which the leading portion of a single sheet has been adhered is then progressed across the supply 74. The length of the sheets within the supply 74 is preferably slightly greater than the circumference of the rolls 10. When sheets of this size are wrapped upon the rolls 10, the edges 100 and 102 will overlap and we prefer to adhesively secure such overlapped edges together. Thus, at position IV in Figure 3, the roll 10 has progressed through a complete revolution and the leading edge 100 of the sheet thereon is pressed into contact with the paste bearing surface of the paste belt 107. A stripe of paste 108 is therefore deposited upon the leading edge 100. As the roll 10 leaves position IV, the trailing edge 102 of the sheet thereon is withdrawn from beneath the belt 107. The trailing portion of the sheet is therefore in position to be pressed into contact with the paste stripes indicated at P and the trailing edge 102 is in a position to be pressed into contact with the paste stripe 108 upon the leading edge 100. The roll 10 is then progressed across the table 123 and performs a complete revolution thereupon. This places the roll 10 in the position illustrated at V in Figure 3 wherein the leading and trailing portions 100 and 102 respectively of the sheet are pressed into contact with the paste stripes indicated at P and the trailing edge 102 is pressed into contact with the paste stripe 108. As discussed above, the preliminary drying of the paste, which will occur as the rolls are progressed from position IV to position V, will be sufficient to permit of the discharge of the rolls from the machine.

It will be understood that the rolls 10 to which bands or wrappers have been applied, as above set forth, may be conveyed from the discharging station of our machine to a final drying station or to any other apparatus for the further processing thereof.

In Figure 7, we have diagrammatically illustrated an embodiment of our invention which is particularly adapted for the successive application of an insert or label and a band or wrapper to a roll. It is frequently desired to apply an insert and then to enclose the roll in a wrapper, which may preferably be made of some transparent material such as "Cellophane." In Figure 8, we have shown an insert L applied to roll 10, while in Figure 9, a roll with an insert attached thereto is shown enclosed in a wrapper.

Referring now to Figure 7, it may be seen that a roll 10 is rolled over a guard plate 158, paste-applying belts 138 and guard plate 159. This paste-applying apparatus is so adjusted as to apply stripes of paste indicated at R of a peripheral extent equal to the peripheral extent of an insert which is to be applied to the roll. The paste-bearing roll 10 is then progressed over a separator 199 similar in all respects to the separator 99, described above, to a supply 174 of inserts. The horizontal distance between the paste-applying belts 138 and the leading edge of the inserts L is so chosen that an end of the paste stripes R coincides with the leading edge of an insert L when the roll 10 is progressed to the supply 174. The roll 10 is then progressed over the supply 174 where it picks up an insert L, which will be adhesively secured to the surface of the roll by the paste stripes R.

The roll 10 then progresses over a guard plate 258 and paste-applying belts 238 and a guard plate 259. The horizontal distance between the insert supply 174 and the paste belts 238 is so chosen that paste stripes S are applied to a portion of the horizontal surface of the roll 10 which is removed from the insert L. For example, this horizontal distance may be so chosen that the paste stripes S are placed in a position diametrically opposite the paste stripes R. The roll 10 is then progressed over a separator 299 to a supply 274 of wrappers. The horizontal distance between the paste belts 238 and the leading edge of the wrapper supply 274 may be so chosen that the leading edge of a wrapper W will be contacted by the paste stripes S at a point substantially mid-way of their peripheral extent. The wrappers W may therefore be applied in substantially the same manner as illustrated in Figure 3. To this end, the rolls 10 are progressed across the supply 274 and into contact with a transversely extending paste-applying belt 297. From the position indicated at the extreme right hand end of Figure 7, the rolls 10 may be progressed through a preliminary drying and discharging station similar in all respects to the station D illustrated in Figures 1, 2 and 3 inclusive.

It will be understood that the supplies 174 and 274 will be arranged to receive compensatory vertical movements in response to the depression of a roller 193 in substantially the same manner as the supply 74 illustrated in Figure 1. It will be further understood that the inserts L may be of any desired size as may be the wrappers W and that the mechanism illustrated in Figure 7 may be adapted to successively apply a plurality of bands or a band and a label or a wrapper and a label or a plurality of wrappers.

From the foregoing detailed description of preferred forms of our invention, it may be seen that we have provided mechanism for attaining the objects of our invention hereinbefore enumerated. Variations and modifications may be resorted to within the scope of the appended claims.

We claim:

1. In a machine of the class described, means for applying adhesive to the curved surfaces of a series of cylindrical objects comprising an adhesive bearing member over which said objects are adapted to be rolled, a supply of wrappers over which said objects are adapted to be rolled, a plurality of individually movable means adapted to overlie portions of said adhesive bearing member, said last named means being adjustable relative to one another to vary the extent of said adhesive bearing member exposed for contact with said objects and being adjustable to vary the distance between the exposed portions of said adhesive bearing member and said supply of wrappers whereby a wrapper will be picked up by the adhesive on each of said cylindrical objects.

2. In a machine of the class described, means for progressively rolling a series of cylindrical objects along a path, means for applying adhesive to each of said objects while rolling along said path, said last named means comprising a plurality of endless belts extending longitudinally of said path, means for applying adhesive to a surface of each of said belts, means supporting predetermined reaches of said belts in the path of said cylindrical objects, a plurality of individually movable plates adapted to overlie opposite ends of said reaches, said plates being adjustable along the path of said cylindrical objects to vary the extent and location of those portions of said belts exposed for contact with said cylindrical objects.

PAUL BURKE.
JOHN EDWARD BLOSSER.